Patented Mar. 27, 1923.

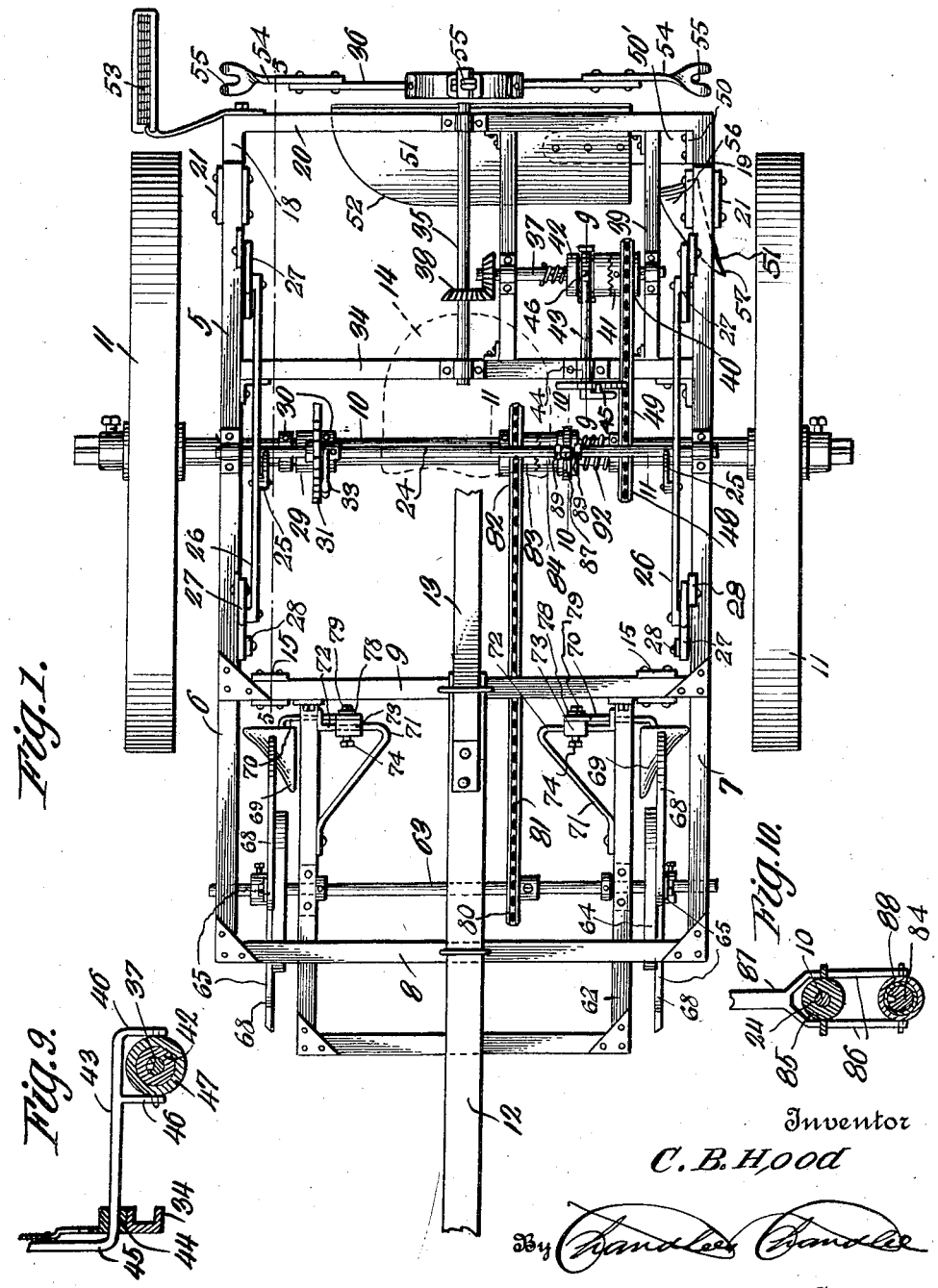

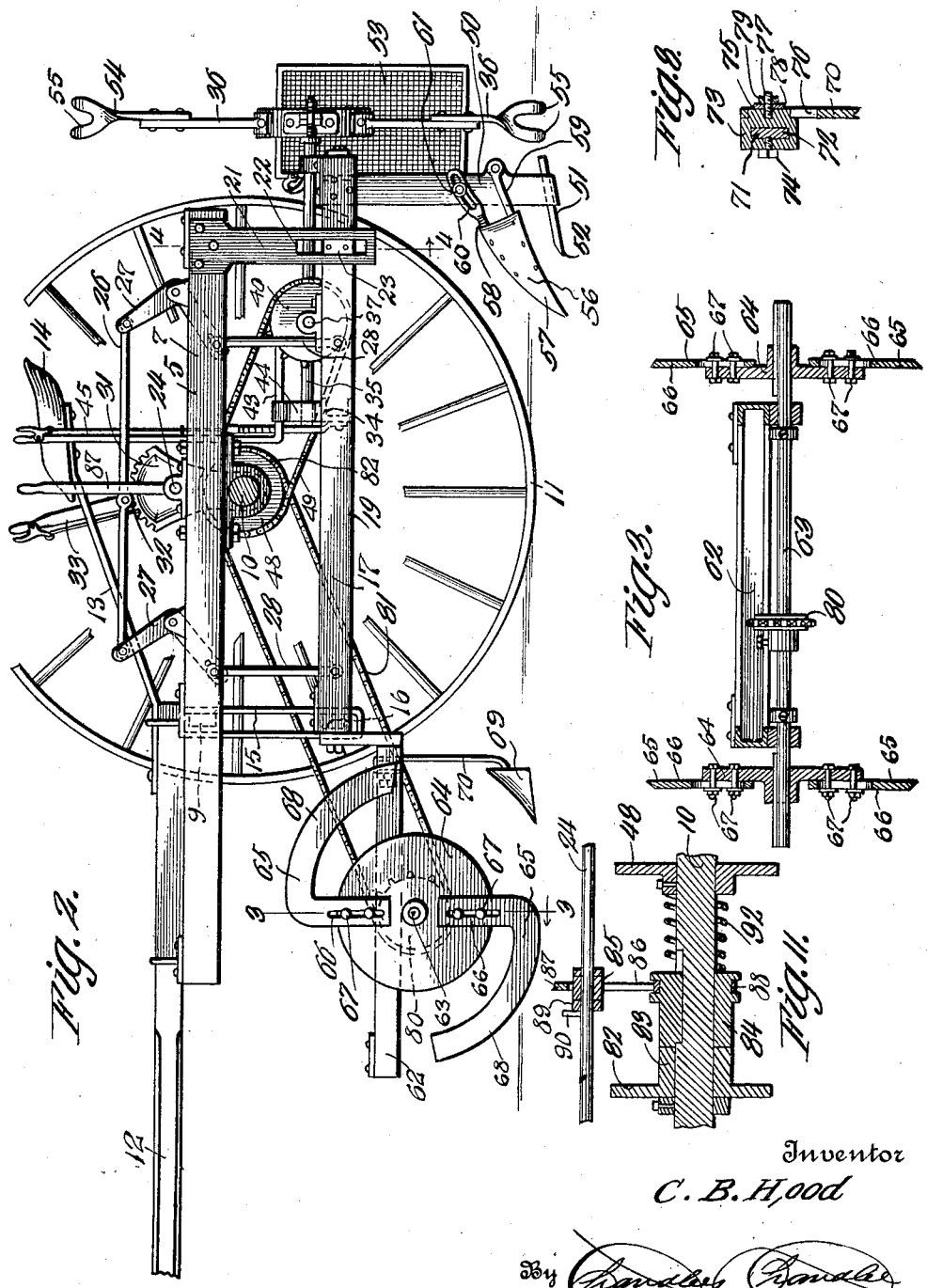

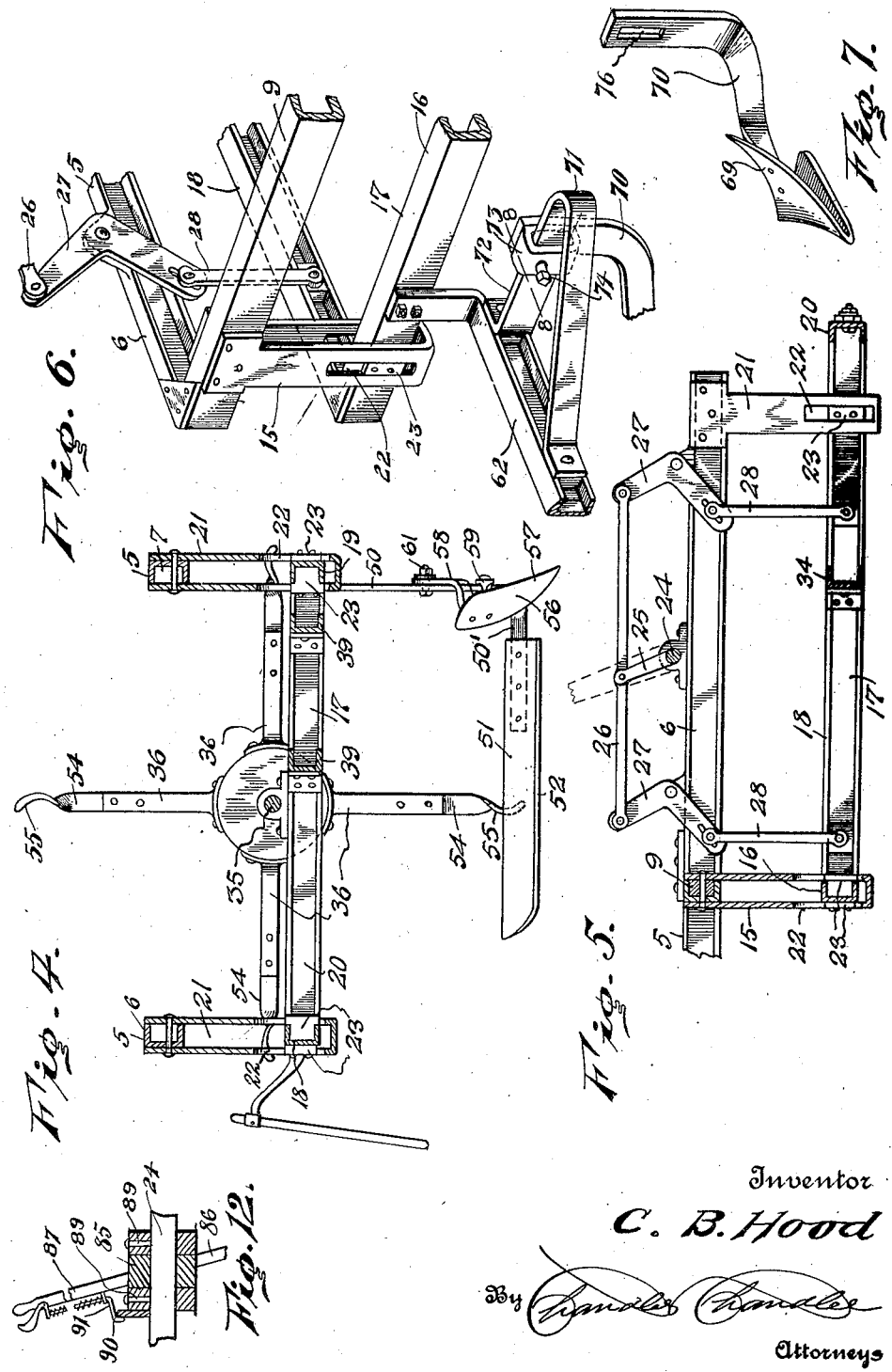

1,449,944

UNITED STATES PATENT OFFICE.

CHARLES B. HOOD, OF BEAUMONT, TEXAS.

HARVESTER.

Application filed July 28, 1919. Serial No. 313,662.

*To all whom it may concern:*

Be it known that I, CHARLES B. HOOD, a citizen of the United States, residing at Beaumont, State of Texas, have invented certain new and useful Improvements in Harvesters; and I do hereby declare the following to be a full, clear, and exact description of the invention, such as will enable others skilled in the art to which it appertains to make and use the same.

This invention relates to harvesting machines, and more particularly to machines designed for harvesting peanuts, sweet potatoes, Irish potatoes, and other products planted in hill rows.

It has for its object to provide a harvesting machine which, in its operation, will act to excavate and loosen the earth forming the hill and which will include also means for separating the product planted in the hill from the earth, after the excavation from the hill, this separating means being so constructed as to deliver the product at one side of the machine.

In the harvesting of sweet potatoes, and other products in which the vines are of a trailing nature, and as well in the harvesting of peanuts under conditions in which the field may be overgrown with briers, it is necessary, ordinarily, to clear the rows by what is known as "baring out", with a hoe. This process consists of chopping off the trailing portions of the vines or briers with the hoe and drawing them to one side, so as to leave the row clear for the process of harvesting. Without such an operation, the trailing vines and briers quickly clog any machinery used for harvesting the product. It is therefore an object of the present invention to provide a machine including means for "baring out" the rows in advance of the excavating mechanism and it is also an object to provide a "baring out" mechanism especially adapted for use in sandy soil. It has been found that the ordinary rolling coulter when used in sandy soil, only serves to press vines and briers down into the soil, without cutting them.

Another object of the present invention is to provide a machine having the hereinstated characteristics which will be adjustable to suit different conditions of use.

In the drawings:—

Figure 1 is a top plan of the complete machine.

Figure 2 is a side elevation.

Figure 3 is a detail section through the "baring out" mechanism taken on line 3—3 of Figure 2.

Figure 4 is a section taken transversely of the machine on line 4—4 of Figure 2, illustrating the excavating blade, the guard plow, and the throwing arms in elevation, and illustrating the slidable mounting of the sub-frame in section.

Figure 5 is a detail section on line 5—5 of Figure 1, illustrating the arrangement of the mechanism for raising and lowering the sub-frame.

Figure 6 is a detail perspective view showing the arrangement of the sub-frame in one of the hangers, a portion of the raising and lowering mechanism and a portion of the forward sub-frame with the mounting of one of the baring out plows.

Figure 7 is a detail perspective view of one of the baring out plows.

Figure 8 is a detail section on line 8—8 of Figure 6, showing both the horizontal and vertical adjustments of the baring out plows.

Figure 9 is a detail section on line 9—9 of Figure 1, showing the construction of one of the clutch levers.

Figure 10 is a detail section on line 10—10 of Figure 1 showing the construction of another clutch lever.

Figure 11 is a detail section on line 11—11 of Figure 1, showing the construction of the clutch mechanism which controls the "baring out" mechanism.

Figure 12 is a detail sectional view showing the mounting of one of the clutch levers.

Referring now to the drawings, the present invention includes a main draft frame 5, including side sills 6 and 7, a front sill 8, and a transverse brace sill 9, extending between the sills 6 and 7 forwardly of their centers. The rearward end of the frame 5 is thus open, as shown.

A live axle 10 is mounted transversely of the sills 6 and 7 therebeneath, extending laterally therebeyond, this axle being located rearwardly of the sill 9, and mounted upon the outwardly extending end portions of the axle there are supporting ground wheels 11, which are adjustable longitudinally of the axle to vary tread width.

Secured to the sills 8 and 9, there is a suitable draft tongue 12, and secured to this tongue there is a seat supporting spring 13, which carries a seat 14, this seat lying above and just rearwardly of the axle 10.

A pair of vertically extending hangers 15 are secured to and depend from the sill 9, adjacent to its end, these hangers being U-shaped, and receiving between the side portions thereof the front sill 16 of a sub-frame 17.

The sub-frame includes also side sills 18 and 19, and a rear sill 20. Hangers 21 are secured to and depend from the rearward ends of the sills 6 and 7 of the frame 5, these hangers being also of U-shape, and they receive between their side portions the side sills 18 and 19 of the sub-frame. The side portions of each of the hangers are provided with longitudinal slots 22, in which work blocks 23, secured to the sills of the sub-frame, these blocks thus serving to prevent longitudinal movement of these sills with respect to the hangers.

Means for raising and lowering the sub-frames with respect to the draft frame 5 are provided, these means including a shaft 24, journaled transversely of the frame 5, directly above the axle 10. Adjacent to its ends this shaft is provided with crank arms 25, which are connected by means of links 26 with bell-crank levers 27 pivotally mounted upon the sills 6 and 7, and connected with the sub-frame 17 by means of vertically extending links 28, the arrangement being thus such that when the shaft 24 is rocked in one direction, the sub-frame will be elevated, while rocking motion of the shaft 24 in the other direction will lower the sub-frame.

A sleeve 29 is engaged with the axle 10, for rotation of the axles therewithin, this sleeve lying between collars 30, secured upon the axle. The sleeve is provided with an upwardly extending notched sector 31, through which the shaft 24 is rotatably engaged, and this sector is located in position for engagement by a dog 32, carried by a hand lever 33 which extends upwardly from the shaft 24. By means of the dog and sector, the shaft 24 may be held with the sub-frame 17 at different points of its vertical movement.

The sub-frame 17 includes a transverse brace and supporting sill 34, spaced forwardly from the sill 20, and journaled upon the sills 34 and 20 longitudinally of the machine and centrally thereof, there is a shaft 35, which extends rearwardly beyond the sill 20, and which carries upon its rearwardly extending portion a plurality of radially extending throwing arms 36, these arms being thus arranged to travel in a plane extending transversely of the machine.

A shaft 37 is journaled in the sub-frame at right angles to the shaft 35 and has driving connection with the latter through the medium of bevel gearing 38, this shaft 37 being mounted upon short sills 39 secured between the sills 20 and 34, and thus the shaft 37 lies rearwardly of the sill 34.

Loosely mounted upon the shaft 37 there is a sprocket 40 which carries a clutch member 41, and splined upon the shaft 37 there is a coacting clutch member 42. An operating shaft 43 for this clutch member is mounted for rocking in a suitable bearing 44, secured upon the sill 34, and this shaft 43 has its portion forwardly of the bearing 44 turned upwardly in the form of a lever 45. The rearward end of the shaft 43 has depending yoke arms 46, pivotally connected with a clutch collar 47 surrounding the clutch member 42 as illustrated. It will be seen that this arrangement of the clutch operating shaft 43 brings the lever 45 within easy reach from the seat 14.

In alignment with the sprocket 40, longitudinally of the machine, there is a sprocket 48, carried by the axle 10, and a chain 49 is trained over these sprockets. Secured to the rearward end portion of the sill 19 of the sub-frame 17, there is the downwardly extending supporting arm 50 of a transversely extending excavating blade 51, the cutting edge 52 of which is directed forwardly. The lower end portion of the arm 50 is turned laterally as indicated at 50', and is given a slight transverse slant so as to elevate its rearward edge. The blade 51, secured as it is upon the laterally turned portion 50' of the arm 50 thus has its forward cutting edge 52 directed downwardly.

By reference especially to Figure 2, it will be seen that the lowermost point in the circular path of movement of the extremities of the arms 36 lies just rearwardly of and just below the rearward edge of the blade 51.

Thus, as the arms 36 rotate, they move longitudinally of the blade 51 when passing through the lower arc of their movement, and will engage excavated earth passing over the blade, throwing this earth laterally. In use, the machine is driven along a row containing the product ready for harvesting, with the wheels 11 at opposite sides of the row, and with the blade 51 in position to cut beneath the row. The earth constituting the row, with the product to be harvested therein, thus moves above and rearwardly of the blade 51, and, being engaged by the arms 36, the earth is thrown laterally together with the product therein; and secured to the frame 17 in such position as to lie in the path of movement of material thrown laterally by the arms 36, there is an impact screen 53, which receives the earth and product thereagainst.

As shown in the drawings, the arms 36 include terminal blade portions 54 which are broadened laterally and bifurcated to produce spaced fingers 55 these fingers being curved slightly in the reverse direction of rotation of the arm.

So as to prevent clogging of earth against the arm 50, a guard plow 56 is provided, this plow including a blade 57 secured to arms 58 and 59, and the arm 58 which lies above the arm 59 is provided with an arcuate slot 60, receiving therethrough the stem of a clamping bolt 61 engaged in the arm 50. By reason of this structure, movement of the arm 59 upon its pivotal connection with the arm 50 will result in vertical movement of the point of the guard plow 57, and thus the depth of cut of this plow may be adjusted. The clamping bolt 61 will serve to hold it at different points of its adjustment.

Removably secured to the forward sill 16 of the sub-frame 17, there is a forward sub-frame 62 which has journaled therein a transverse shaft 63 the ends of which extend laterally beyond the frame 62. As shown, the frame 62 is somewhat narrower than the frame 17. Splined upon the outwardly extending end portions of the shaft 63 are disks 64 to which are adjustably connected baring out blades 65.

These blades 65 include slotted shanks 66 which are overlapped upon the disks 64 and which receive through their slots clamping bolts 67 engaged in the disks. The shanks 66 extend radially of the disks, and by reason of the arrangement of their slots and the clamping bolts 67 the shanks are adjustable longitudinally with respect to the disks.

The blade portions proper of the blade 65 are indicated at 68, these blade portions being arcuate in form as illustrated, and extending in opposite directions from their shanks 66 so that these blade portions extend in a common direction circumferentially of the disk.

The curvature of the blade portions 68 is eccentric to the shaft 63, the points of greatest eccentricity lying at the free ends of the blade portions. Means, to be later described, are provided for rotating the shaft 63, and this rotation is such that the attached ends of the blade portions 68 first engage the ground and thus, by reason of the eccentricity of the blade portions, their depth of cut is constantly increased from their attached to their free ends. This is the feature of these baring out blades which renders them especially efficient when the machine is used in sandy soil, since the blades have a positive draw-knife action against vines and briers engaged and cut by them.

Rearwardly of each of the disks 64 and its blade 65, there is what will be termed a "baring out plow" 69, these plows being carried by arms 70 adjustably connected with the frame 62 for both lateral and vertical movement. This adjustable connection is accomplished through the medium of brackets 71, one for each plow 69, these brackets being secured to the side portion of the frame 62. Each bracket includes a transversely extending horizontal bar 72, upon which there is a sleeve 73 slidably engaged, a set screw 74 being provided to hold this sleeve at different points of its movement along the bar. The sleeve carries a vertically extending lug 75, which is slidably engaged in a slot 76 formed in the corresponding arm 70. A stub bolt 77 is engaged in the lug 75, projecting outwardly beyond the corresponding arm 70, and this stub bolt has a washer 78 and a nut 79 engaged therewith, the nut being operable to clamp the washer against the arm 70 to hold it at different points of its vertical movement with respect to the sleeve 73, this vertical movement being permitted by the slot 76, which is considerably longer than the lug 75. This structure is most clearly illustrated in Figures 6, 7 and 8.

From the foregoing it will be seen that by reason of the fact that the disks 64 are adjustable transversely of the machine upon the shaft 63 while the plows 69 are adjustable transversely of the machine upon the arms 72, both the bearing out blades and the bearing out plows may be set according to the width of the row to be excavated, and, correspondingly, both the blades 65 and the plows 69 may be adjusted vertically according to conditions.

For rotating the shaft 63, this shaft is provided with a sprocket 80 with which there is engaged a chain 81, this chain being also engaged with a sprocket 82 loosely mounted upon the axle 10. This sprocket 82 carries a clutch member 83, which is adapted to be engaged by a clutch member 84 splined upon the axle 10. Loosely mounted upon the shaft 24 there is a sleeve 85, embraced by the arms 86 of a yoke lever 87, the arms 86 being pivoted to the sleeve 85, as illustrated particularly in Figure 10. These arms 86 extend downwardly to embrace also the clutch member 84, and at their lower ends they are pivoted to a clutch collar 88 operatively engaged with the clutch member 84 so that as the lever 87 is rocked with respect to the sleeve 85, the clutch member 84 will be moved into or out of engagement with the clutch member 83. Rotation of the shaft 63 is thus under the control of the operator of the machine. At each side of the sleeve 85, a collar 89 is fixed upon the shaft 24, and one of these collars includes an upstanding lip 90 which may be engaged by a dog 91, carried by the lever 87 to hold this lever with the clutch member 84 out of engagement with the member 83. A spring 92 encircling the axle 10 between the clutch member 84 and the sprocket 48 and bearing thereagainst, normally holds the clutch member 84 in engagement with the clutch member 83.

In its complete operation, the machine having been set in its various adjustments according to the row to be excavated, it is driven over the ground, with the wheels 11 at opposite sides of the row as already stated. Trailing vines, briers and weeds etc., which extend laterally from the row are engaged and cut by the baring out blades 65, and this cut débris together with earth at the sides of the row is thrown laterally by the baring out plows 69. The row is thus left clean at its sides so that a minimum of waste matter passes over the excavating blade 51 to be engaged by the throwing arms 36 as already explained.

What is claimed is:—

1. A bearing out mechanism for harvesters including a rotary shaft and arcuate blades connected with the shaft, the curvature of said blades being eccentric to the shaft.

2. A bearing out mechanism for harvesters including a rotary shaft and arcuate blades connected with the shaft for adjustment longitudinally of the shaft and radially thereof, the curvature of said blades being eccentric to the shaft.

3. A harvester comprising a frame, a shaft rotatably connected with the forward end portion of the frame, hubs adjustably mounted upon the shaft for adjustment longitudinally of the shaft and transversely of the frame, knives connected with the hubs for adjustment radially thereof, and furrow-forming plows positioned to the rear of the knives and connected with the frame for adjustment transversely thereof.

4. A harvester comprising a frame, excavating means carried by the frame and having a blade extended transversely of the frame, a standard carrying the blade and connected with the frame, a guard blade positioned in front of said standard, a lower supporting arm for the guard blade pivotally connected with the standard, and an upper supporting arm for the guard blade adjustably connected with the standard for releasably retaining the guard blade in a vertically adjusted position.

In testimony whereof, I affix my signature, in the presence of two witnesses.

CHARLES B. HOOD.

Witnesses.
 S. M. KING,
 R. L. LAMAR.